United States Patent
Numata

[11] Patent Number: 6,088,372
[45] Date of Patent: *Jul. 11, 2000

[54] TIME DIVISION MULTIPLEXING SYSTEM FOR DIGITAL EXCHANGE

[75] Inventor: Yasushi Numata, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/892,395

[22] Filed: Jul. 15, 1997

[30] Foreign Application Priority Data

Jul. 15, 1996 [JP] Japan ...................... 8-184851

[51] Int. Cl.⁷ .............. H04L 12/50; H04Q 11/00
[52] U.S. Cl. .............. 370/539; 370/375; 370/391
[58] Field of Search .................. 370/536, 537, 370/538, 375, 391, 360, 366, 396, 270, 539, 540, 541

[56] References Cited

U.S. PATENT DOCUMENTS

| | | | |
|---|---|---|---|
| 4,009,345 | 2/1977 | Flemming et al. | 370/321 |
| 4,855,999 | 8/1989 | Chao | 370/538 |
| 4,893,310 | 1/1990 | Robertson et al. | 370/270 |
| 5,329,579 | 7/1994 | Brunson | 379/88.26 |
| 5,583,864 | 12/1996 | Lightfoot et al. | 370/396 |

FOREIGN PATENT DOCUMENTS 49-24302  3/1974  Japan.

*Primary Examiner*—Hassan Kizou
*Assistant Examiner*—John Pezzlo
*Attorney, Agent, or Firm*—Foley & Lardner

[57] ABSTRACT

The invention provides a time division multiplexing system for a digital exchange which suppresses appearance of a time slot which, although exchanging can be performed by a time division switch, is put into a non-used state to improve the efficiency in use and which allows line interface apparatus to be accommodated in a time division multiplexing highway even where the line interface apparatus require a multiplicity larger than that of the highway to suppress an increase in circuit scale and simplify the circuit construction. The system includes a multiplicity display section provided in each line interface section for setting and displaying a multiplicity of channels per one frame to be time division multiplexed and outputted by and from a line interface section, a multiplicity changing section provided in a multiplex conversion circuit corresponding to each time division multiplexing highway accommodated in the multiplex conversion circuit for changing the multiplicity of the time division multiplexing highway, and a control section for reading the multiplicity display sections and transmitting the multiplicities set in them to the corresponding multiplexing changing sections.

7 Claims, 5 Drawing Sheets

TIME DIVISION MULTIPLEXING SYSTEM FOR DIGITAL EXCHANGE

BACKGROUND OF THE INVENTION

1. Field of the Invention

This invention relates to a time division multiplexing system for a digital exchange, and more particularly to a time division multiplexing system for time division multiplexing highways between line interface sections which accommodate line interface apparatus such as subscriber lines or/and trunk circuits and a time division switch.

2. Description of the Related Art

In a digital exchange, when channels which correspond to line interface sections in which line interface apparatus such as subscriber lines or/and trunk circuits are accommodated are inputted to a time division switch, time division multiplexing is performed in a plurality of stages between the line interface sections and the time division switch to multiplex a number of channels per one frame to a multiplicity with which exchanging processing of the channels can be performed by the time division switch, and the thus multiplexed channels are inputted to the time division switch.

If it is assumed that the time division switch effects exchanging processing of, for example, 480 channels per one frame, each of the line interface sections first outputs channels to a first time division multiplexing highway which has a multiplicity of 30 channels per one frame, and four such first time division multiplexing highways are collectively multiplexed and outputted as a second time division multiplexing highway which has another multiplicity of 120 communication channels per one frame. Finally, four such second time division multiplexing highways are collectively multiplexed so that they are inputted as a time division multiplexing highway having a further multiplicity of 480 communication channels per one frame to the time division switch.

In this manner, in the conventional digital exchange, the time division multiplexing highways in each stage have an equal multiplicity per one frame such that the first time division multiplexing highways have the multiplicity of 30 channels and the second time division multiplexing highways have the multiplicity of 120 channels.

FIG. 3 is a block diagram showing an outline of a conventional digital exchange paying attention to time division multiplexing highways outputted from such line interface sections. It is to be noted that, in FIG. 3, such second time division highways as described above are omitted, and it is assumed that n first time division multiplexing highways are time division multiplexed by a multiplex conversion circuit 3 and inputted to a time division switch 2.

Each of the time division multiplexing highways has a multiplicity of 30 channels per one frame and is interposed between one of line interface sections 4₁ to 4ₙ and the multiplex conversion circuit 3 for multiplexing in the next stage. Each of the line interface sections 4₁ and 4₂ accommodates lines of 15 channels, and the line interface section 4a accommodates lines of 90 channels while the line interface section 4ₙ accommodates lines of 30 channels.

In the conventional digital exchanging having such a construction as described above, to each of the line interface sections 4₁, 4₂ and 4₄ (not shown) to 4ₙ, one of time division multiplexing highways 5₁, 5₂ and 5₄ (not shown) to 5ₙ is connected while three time division multiplexing highways 5₃ are connected to the line interface section 4₃.

The conventional digital exchange is disadvantageous in that, since the time division multiplexing highways in each stage have a uniform multiplicity in this manner, depending upon the type of the line interface apparatus accommodated in a line interface section or the number of accommodated line(for example, a subscriber circuit in which 15 lines are accommodated, a private line trunk circuit in which 30 lines are accommodated), where the multiplicity of a line interface section is smaller than 30, some channels on the corresponding time division multiplexing highway may be idle, or where the multiplicity of a line interface section is larger than 30, a plurality of time division multiplexing highways must be connected to the line interface section, and also in that the circuit scale of the digital exchange is increased by an arrangement of connectors for such connection.

FIGS. 4(a) and 4(b) illustrate the disadvantages described above and illustrate relationships between a line interface section and a frame construction on a time division multiplexing highway.

FIG. 4(a) illustrates the relationship where the number of lines accommodated in a line interface section is smaller than 30 and particularly where line interface apparatus for 24 channels are accommodated in the line interface section. As seen from FIG. 4(a), while a time division multiplexing highway having a 32-time slot construction (30 channel time slots+2 signal time slots) per one frame is used, since the number of channels used in this instance is 24, the remaining 6 channels are not used and are idle.

FIG. 4(b) illustrates the relationship where the number of lines accommodated in a line interface section is larger than 30 and particularly where line interface apparatus for 90 channels are accommodated in the line interface section. In this instance, as seen from FIG. 4(b), three time division multiplexing highways having a 32-time slot construction per one frame must be connected, and connectors for the connection and a circuit or the like for clustering the three time division multiplexing highways into one cluster must be provided, which increases the circuit scale.

SUMMARY OF THE INVENTION

The present invention solves the problems described above which are encountered where line interface apparatus such as subscriber circuits or/and trunk circuits are accommodated in line interface sections of a digital exchange.

In particular, it is an object Of the present invention to provide a time division multiplexing system for a digital exchange which suppresses appearance of a time slot which, although exchanging processing can be performed by a time division switch, is put into a non-used state to improve the efficiency in use of a time division multiplexing highway.

It is another object of the present invention to provide a time division multiplexing system for a digital exchange which allows line interface apparatus to be accommodated in a time division multiplexing highway even where the line interface apparatus requires a multiplicity larger than that of the time division multiplexing highway so that an increase in circuit scale can be suppressed and the circuit construction can be simplified.

In order to attain the object described above, according to the present invention, there is provided a time division multiplexing system for a digital exchange which includes a plurality of line interface sections each accommodating a plurality of line interface apparatus such as subscriber circuits or/and trunk circuits for time division multiplexing and outputting channels of the line interface apparatus accommodated therein to a first time division multiplexing highway, and a multiplex conversion circuit accommodating the first time division multiplexing highways for time division multiplexing and outputting channels inputted from the first time division multiplexing highways to a second time division multiplexing highway, the time division multiplexing system comprising multiplicity display means provided in each of the line interface sections for setting and displaying a multiplicity of channels per one frame to be time division multiplexed and outputted by and from the line interface section, multiplicity changing means provided in the multiplex conversion circuit corresponding to the first time division multiplexing highways accommodated in the multiplex conversion circuit for individually effecting multiplexing conversion in accordance with the multiplicities of the corresponding first time division multiplexing highways, and a control section for reading the multiplicity display means of the line interface sections and transmitting the multiplicities set in the multiplicity display means to the multiplexing changing means of the multiplex conversion circuit corresponding to the first time division multiplexing highways connected to the line interface sections.

In the time division multiplexing system for a digital exchange, a multiplicity outputted from any of the line interface sections is notified to a corresponding one of the multiplicity changing means of the multiplex conversion circuit, and channels on a frame of a corresponding one of the first time division multiplexing highways are read in in synchronism with the multiplicity outputted from the line interface section. Then, the channels thus read are multiplexed with channels read from the other first time division multiplexing highways and outputted to the second time division multiplexing highway.

Preferably, the control section includes a multiplicity setting table for storing the multiplicities set in the individual line Interface sections, and permits, when a request to set or change a multiplicity is received from any of the line interface sections, such setting or changing after confirming that the sum total of the number of channels per one frame based on the multiplicity after such change and the numbers of channels per one frame based on the multiplicities of the other line interface sections does not exceed a multiplicity which can be set for the second time division multiplexing highway.

In this instance, even if the multiplicity of any of the first time division multiplexing highways can be set arbitrarily, the degree of freedom in such setting remains within a range within which the sum total of the numbers of channels on the first time division multiplexing highways does not exceed the number of channels for one frame on the second time division multiplexing highway.

Any of the line interface sections to which a multiplicity of an initial value determined in advance is to be set does not require such multiplicity display means as described above.

In this instance, the control section should have a function of automatically setting, if a value to be set to a line interface section is an initial value, the initial value without specifically performing a setting operation.

As described above, in the time division multiplexing system for a digital exchange according to the present invention, the numbers of channels required by the individual line interface sections of the digital exchange are displayed by the multiplicity display means and read by the control section, and the control section controls the multiplicity changing means to set the multiplicities of the corresponding time division multiplexing highways to different multiplicities. Consequently, in the time division multiplexing highways between the line interface sections and the time division switch, appearance of a channel which is put into a non-used state although it can be exchanged by the time division switch can be suppressed. Consequently, the time division multiplexing system is advantageous in that the efficiency in use of the time division multiplexing highways can be improved. Further, also to a line interface section for which a high multiplicity is required, it is required to connect only one time division multiplexing highway. Consequently, the time division multiplexing system is advantageous also in that connectors required for the connection of the time division multiplexing highways can be reduced from those of a conventional time division multiplexing system and the circuit construction can be simplified.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
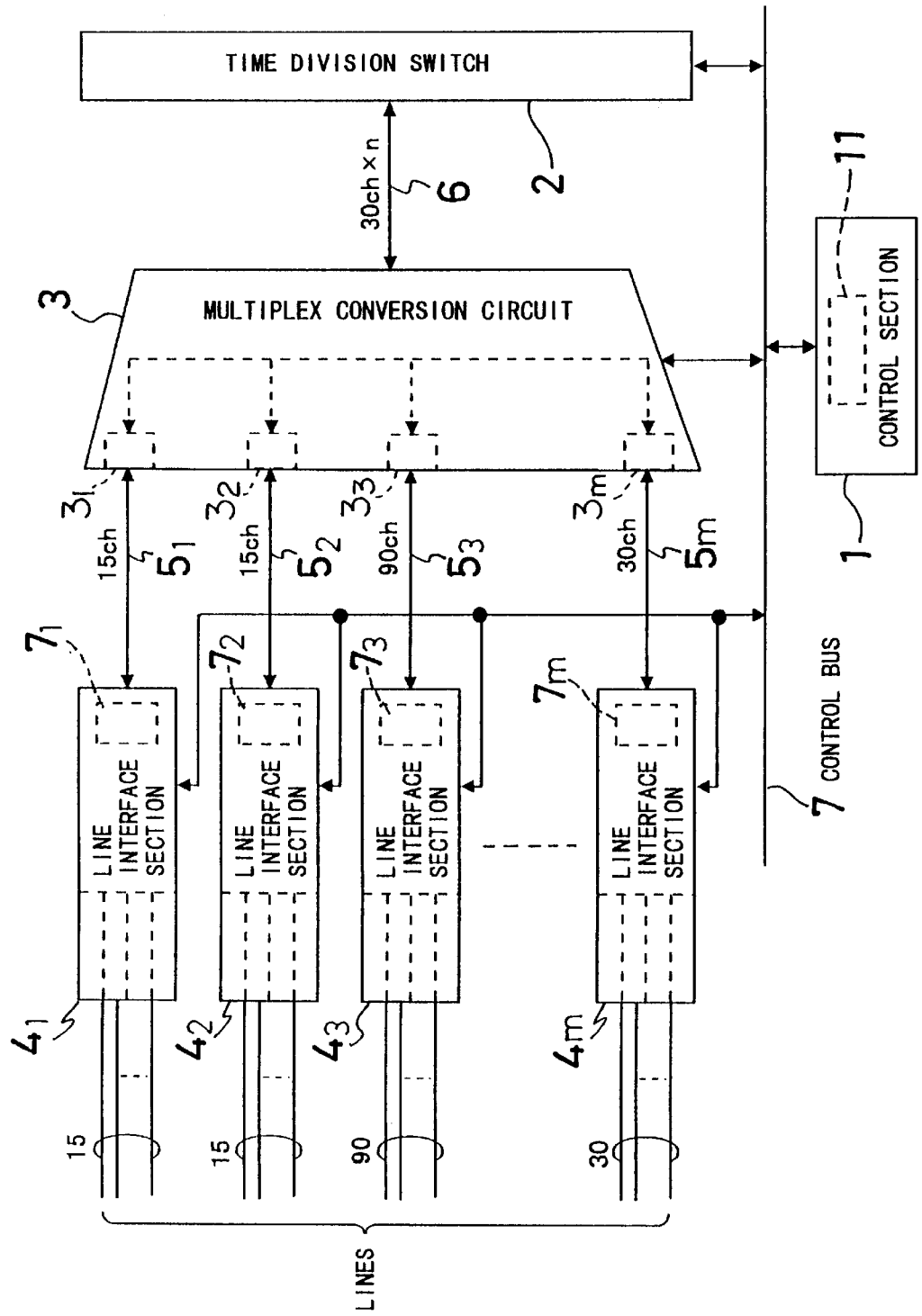
FIG. 1 is a block diagram of a time division multiplexing system for a digital exchange showing a preferred embodiment of the present invention.
Figure 4A:
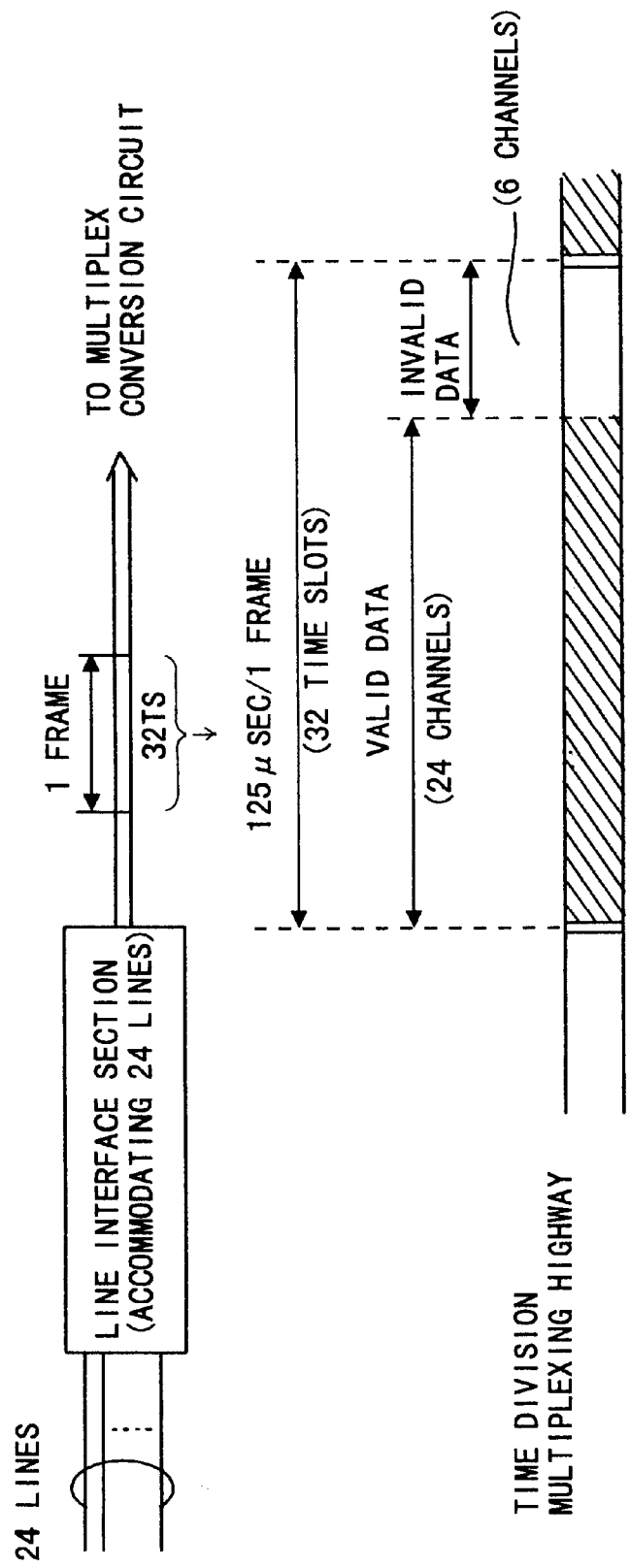
FIGS. 4(a) and 4(b) are diagrammatic views illustrating problems of the conventional time division multiplexing system of FIG. 3 and relationships between a line interface section and a frame construction on a time division multiplexing highway.
Figure 4B:
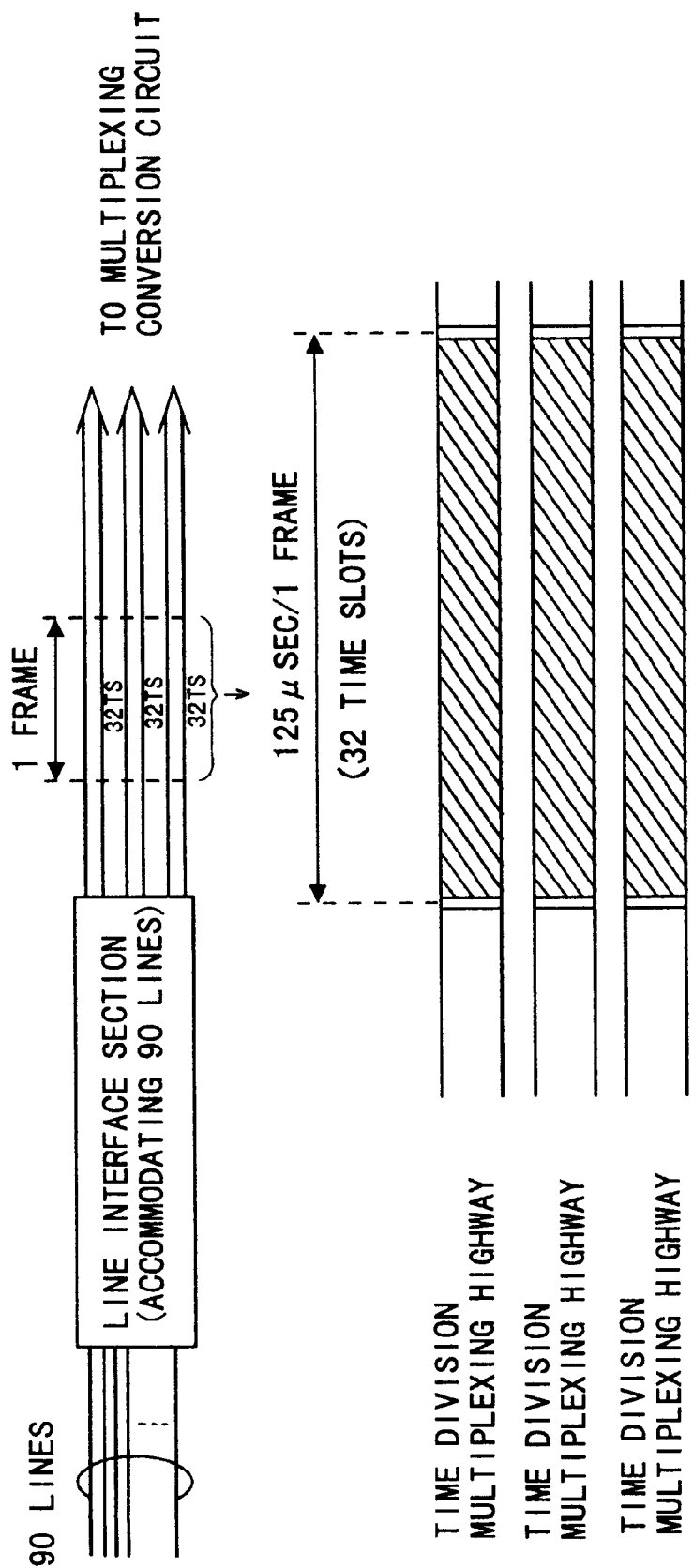

Referring first to FIG. 1, there is shown in block diagram a time division multiplexing system for a digital exchange to which the present invention is applied. The time division multiplexing system shown includes line interface sections $4_1$ to $4_m$. Each of the line interface sections $4_1$ and $4_2$ accommodates line interface apparatus (not shown) of 15 lines; the line interface section $4_3$ accommodates line interface apparatus (not shown) of 90 lines; and the line interface section $4_m$ accommodates line interface apparatus (not shown) of 30 lines. A single time division multiplexing highway is connected to each of the line interface sections $4_1$ to $4_m$, and each of the line interface sections $4_1$ to $4_m$ time division multiplexes channels of line interface apparatus accommodated therein and outputs the multiplexed channels to one of the time division multiplexing highway $5_1$ to $5_m$ connected thereto. The time division multiplexing highway $5_1$ to $5_m$ are connected to a multiplex conversion circuit 3, by which such communication channels are further time division multiplexed and outputted to a time division multiplexing highway 6. The multiplex conversion circuit 3 raises the multiplicity of a time slot of the time division multiplexing highways $5_1$ to $5_m$ inputted thereto to such a multiplicity with which exchanging processing is to be performed by the time division switch 2, and outputs the time slot to the time division multiplexing highway 6 in the next stage. Accordingly, the multiplicity in this instance is 30 channels×n since the time division switch 2 is same as the time division switch in the conventional time division multiplexing system described hereinabove with reference to FIG. 4.

The line interface sections $4_1$ to $4_m$ include multiplicity display elements $7_1$ to $7_m$ for setting and displaying multiplicities (numbers of channels per one frame) required by the line interface sections $4_1$ to $4_m$, respectively, while the multiplex conversion circuit 3 includes, individually for of the time division multiplexing highways $5_1$ to $5_m$ corresponding to the line interface sections $4_1$ to $4_m$, multiplicity changing circuits $3_1$ to $3_m$ for currently changing and controlling the multiplicities of the time division multiplexing highways $5_1$ to $5_m$, respectively. The multiplicities set by the line interface sections $4_1$ to $4_m$ are read by a control section 1 via a control bus 7 and then sent back to the multiplicity changing circuit $3_1$ to $3_m$ similarly via the control bus 7 so that the multiplicities of the time division multiplexing highways $5_1$ to $5_m$ may be set. The control section 1 includes a multiplicity setting table 11 in which the current multiplicities set for the individual time division multiplexing highways $5_1$ to $5_m$ are stored.

Figure 2:
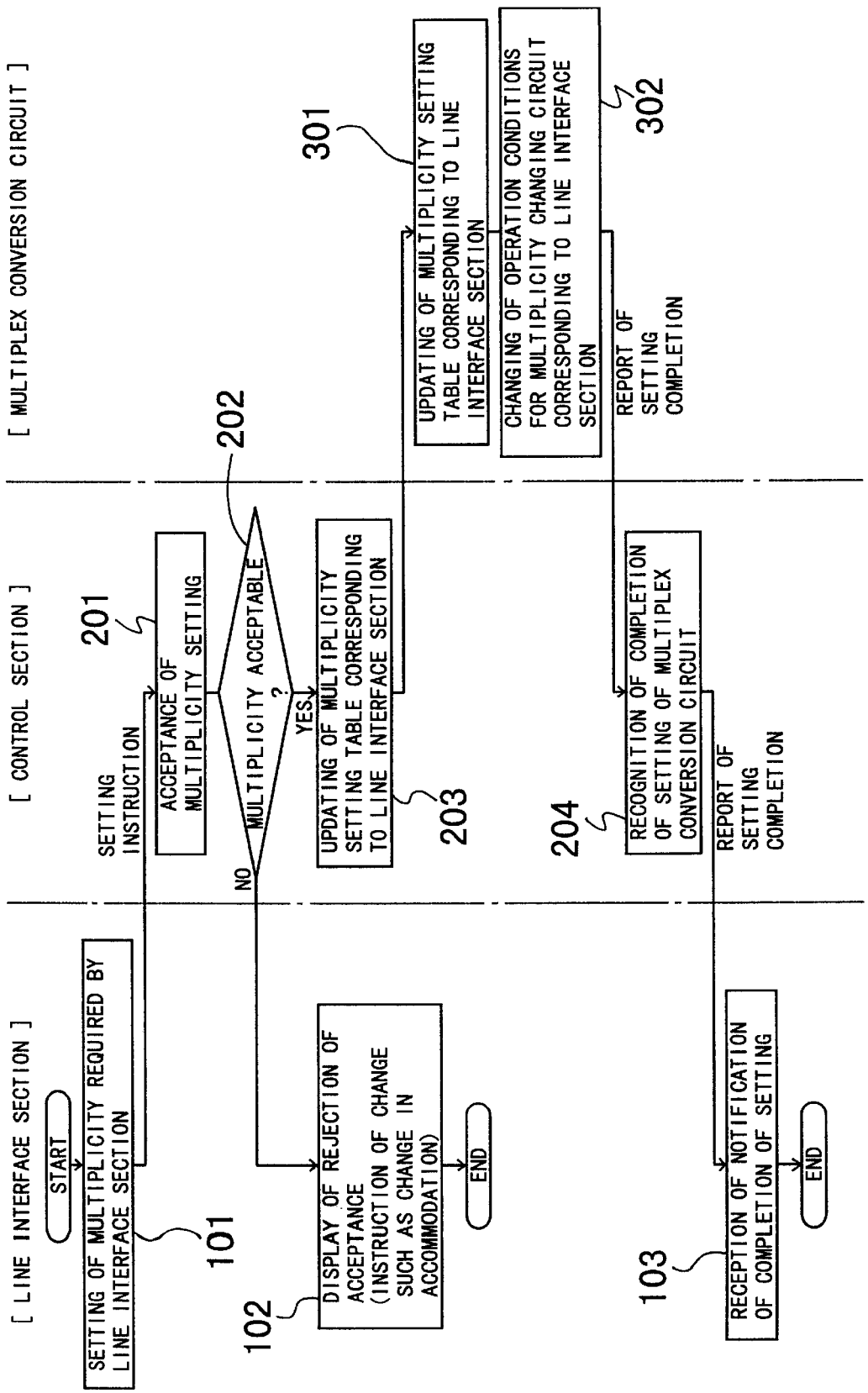
FIG. 2 is a control flow diagram illustrating operation of the time division multiplexing system of FIG. 1.
Figure 3:
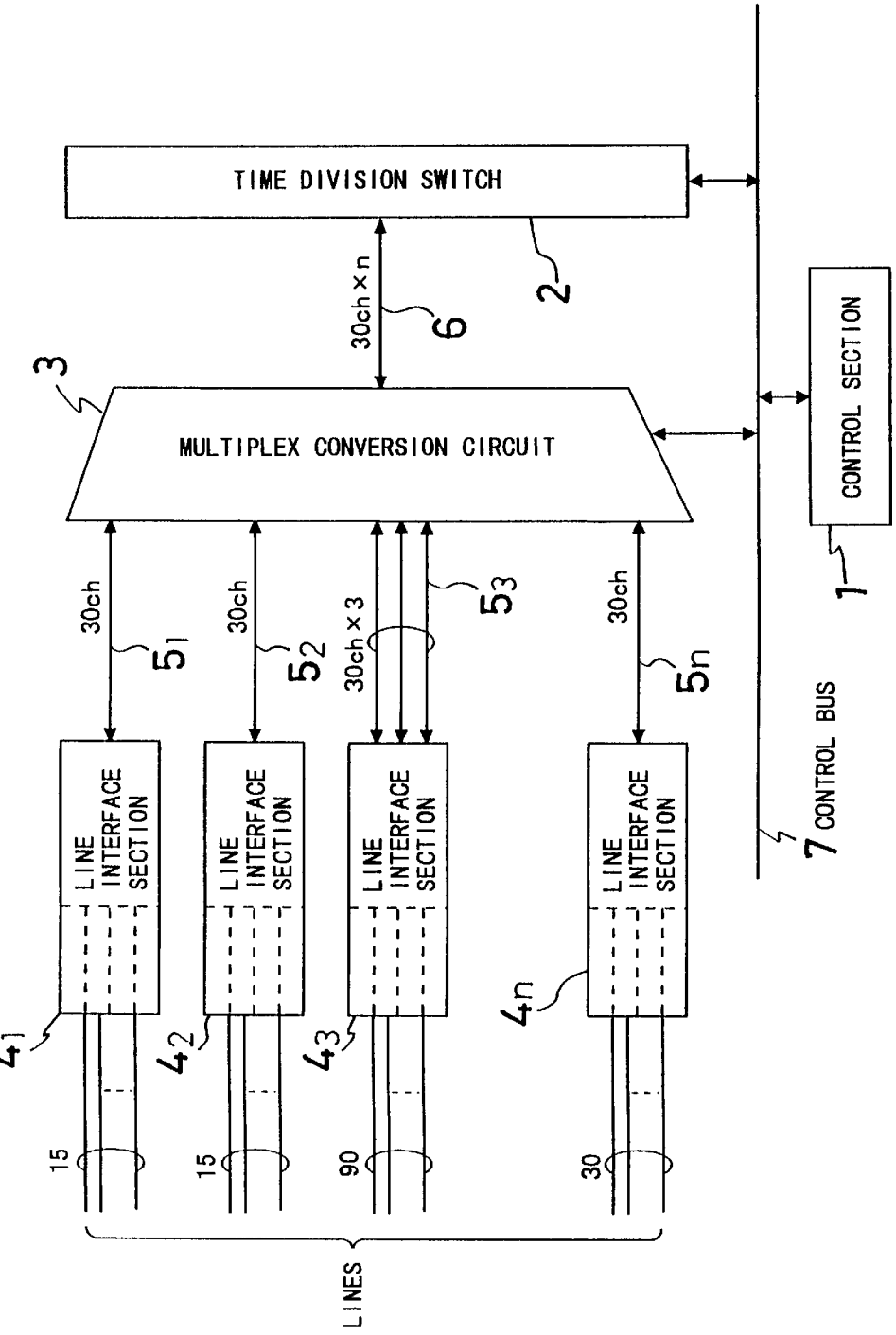
FIG. 3 is a block diagram showing a construction of a conventional time division multiplexing system for a digital exchange.

Subsequently, operation of the system of FIG. 1 is described with reference to a control flow chart of FIG. 2.

First, any of the line interface sections $4_1$ to $4_m$ sets a multiplicity required by the same (step 101). Here, each of the line interface sections $4_1$ to $4_m$ may include a physical switch manually operable by a maintenance engineer for the exchange to set a multiplicity upon construction for accommodation of a line or in a like case, or a man-machine interface terminal may be used on which setting of a multiplicity is performed using software installed in the terminal and including such setting as an operation relating to operation for updating of office data. The multiplicity of the line interface section set in this manner is read out by the control section 1 as part of operation upon initial setting of the exchange or as part of a multiplicity setting operation (step 201).

The control section 1 refers to the data stored in the multiplicity setting table 11 thereof and the data of a multiplicity for which the request for setting has been received to discriminate whether or not the request for setting is acceptable (step 202). This discrimination is confirmation of whether or not the number of channels based on the sum total of the multiplicities of the time division multiplexing highways between the line interface sections $4_1$ to $4_m$ and the multiplex conversion circuit 3 satisfies the multiplicity to be inputted to the time division switch 2 of the digital exchange. In particular, since the time division multiplexing highway 6 between the multiplex conversion circuit 3 and the time division switch 2 can time division multiplex only 30×n channels as a whole, any request for setting which may cause the total number of channels to exceed 30×n channels cannot be accepted.

If such a situation as described above is encountered (No in step 202), one of the multiplicity display elements $7_1$ to $7_m$ which belongs to the multiplicity display element from which the request for setting has been developed displays rejection of acceptance to reject the request for setting (step 102). Where a man-machine interface terminal is used to effect the setting operation, a message representing that the acceptance of the request for setting is rejected is displayed. If such a state is entered, then the line accommodation of the entire exchange is re-examined to re-set a line accommodation which satisfies the setting requirement.

If it is discriminated, as a result of the discrimination of whether or not the request for setting is acceptable, that the request for setting is acceptable (Yes in step 202), then one of the multiplicities in the multiplicity setting table 11 which corresponds to the line interface section is updated to the newly set value of the multiplicity (step 203).

After the setting operation by the control section 1 is completed in this manner, the control section 1 instructs the multiplex conversion circuit 3 to change the multiplicity of one of the time division multiplexing highways $5_1$ to $5_m$ which is connected to the corresponding line interface section. In response to the instruction, the multiplex conversion circuit 3 updates one of values in a multiplicity setting table thereof which corresponds to the line interface section in a similar manner as in the control section 1 (step 301). After the multiplicity setting table is updated, a corresponding one of the multiplicity changing circuits $3_1$ to $3_m$ which serve as means for setting the multiplicities of the corresponding time division multiplexing highways $5_1$ to $5_m$ changes the setting of operation conditions and so forth so that the setting may correspond to the multiplicity set newly (step 302). An example of the change of the operation conditions is a change of the speed of a clock signal for use to read out data.

After the setting operation of the multiplex conversion circuit 3 is completed, this is reported to the control section 1. Consequently, the control section 1 recognizes the completion of the setting operation of the multiplex conversion circuit 3 (step 204). Then, the control section 1 further notifies the line interface section that the setting of the change of the multiplicity requested has been completed (step 103). In response to the notification, either a lamp for indication of completion of setting is lit, or where a man-machine interface terminal is used to effect such setting operation, a message representing that the setting has been completed is displayed on the terminal.

The multiplicity setting operation of the line interface section is ended thereby.

As a result of such setting as described above, the multiplicities of the time division multiplexing highways $5_1$ to $5_m$ can be set individually corresponding to the numbers of accommodated lines of the individual line interface sections $4_1$ to $4_m$, respectively, such that the multiplicity of the time division multiplexing highway $5_1$ is 15 channels; the multiplicity of the time division multiplexing highway $5_2$ is 15 channels; the multiplicity of the time division multiplexing highway $5_3$ is 90 channels; and the multiplicity of the time division multiplexing highway $5_m$ is 30 channels.

Where the channel number of 30 is determined as a standard multiplicity and the multiplicity of a time division multiplexing highway is set to 30 channels, even if nothing is set to the multiplicity display device of a corresponding line interface section, 30 channels may be set as a multiplicity of an initial value. In this instance, the exchange may be constructed such that, when the control section 1 reads, in an operation of the exchange upon initialization, the multiplicity display device of the line interface section, if it detects that nothing is set in the multiplicity display device, then the line interface section performs an operation of setting a corresponding time division multiplexing highway to 30 channels as the multiplicity of the initial value. By this construction, any circuit interface section which accommodates lines of 30 channels need not perform a setting operation any more, and consequently, the man-hours of a maintenance engineer of the exchange can be reduced.

Further, where it is definite in advance that the number of channels of a particular line interface section does not change from 30 channels at all, such a multiplicity display device as described above need not be provided for the line interface section. In this instance, the control section 1 sets, in an operation of the exchange upon initial setting, a time division multiplexing highway corresponding to the line interface section to 30 channels which is equal to the multiplicity of the initial value. The circuit scale of the line interface section can be reduced thereby.

Having now fully described the invention, it will be apparent to one of ordinary skill in the art that many changes and modifications can be made thereto without departing from the spirit and scope of the invention as set forth herein.

What is claimed is:

1. A time division multiplexing system for a digital exchange which includes a plurality of line interface sections each accommodating a plurality of line interface apparatus such as subscriber circuits or/and trunk circuits, where each line interface section of the plurality of line interface sections may accommodate a number of lines different from a number of lines accommodated by other line interface sections of the plurality of line interface sections, for time division multiplexing and outputting channels of the line interface apparatus accommodated therein to a corresponding single first time division multiplexing highway, and a single multiplex conversion circuit accommodating the first time division multiplexing highways for time division multiplexing and outputting channels inputted from the first time division multiplexing highways to a second time division multiplexing highway, said time division multiplexing system comprising:

multiplicity display means provided in each of said line interface sections for setting and displaying a multiplicity of channels per one frame to be time division multiplexed and outputted by and from the line interface section, where the multiplicity of channels per one frame for each line interface section is set according to the number of lines corresponding to that line interface section;

multiplicity changing means provided in said multiplex conversion circuit corresponding to the first time division multiplexing highways accommodated in said multiplex conversion circuit for individually effecting multiplexing conversion in accordance with the multiplicities of the corresponding first time division multiplexing highways; and a control section for reading the multiplicity display means of the line interface sections and transmitting the multiplicities set in the multiplicity display means to the multiplicity changing means of said multiplex conversion circuit corresponding to the first time division multiplexing highways connected to the line interface sections.

2. A time division multiplexing system for a digital exchange as claimed in claim 1, wherein said control section includes a multiplicity setting table for storing the multiplicities set in the individual line interface sections, and permits, when a request to set or change a multiplicity is received from any of the line interface sections, such setting or changing after confirming that the sum total of the number of channels per one frame based on the multiplicity after such change and the numbers of channels per one frame based on the multiplicities of the other line interface sections does not exceed a multiplicity which can be set for said second time division multiplexing highway.

3. A time division multiplexing system for a digital exchange which includes a plurality of line interface sections each accommodating a plurality of line interface apparatus such as subscriber circuits or/and trunk circuits, where each line interface section of the plurality of line interface sections may accommodate a number of lines different from a number of lines accommodated by other line interface sections of the plurality of line interface sections, for time division multiplexing and outputting channels of the line interface apparatus accommodated therein to a corresponding single first time division multiplexing highway, and a single multiplex conversion circuit accommodating the first time division multiplexing highways for time division multiplexing and outputting channels inputted from the first time division multiplexing highways to a second time division multiplexing highway, said time division multiplexing system comprising:

multiplicity changing means provided in said multiplex conversion circuit corresponding to the first time division multiplexing highways accommodated in said multiplex conversion circuit for individually effecting multiplexing conversion in accordance with the multiplicities of the corresponding first time division multiplexing highways section, where the multiplicity of each of the corresponding first time division multiplexing highways section is converted according to a number lines of the corresponding line interface section; and a control section for transmitting an initially set multiplicity to any of the multiplicity changing means of said multiplex conversion circuit corresponding to the first time division multiplexing highways connected to the line interface sections.

4. The time division multiplexing system for a digital exchange as claimed in claim 1, wherein the second time division multiplexing highway is connected to a time division switch.

5. The time division multiplexing system for a digital exchange as claimed in claim 3, wherein the second time division multiplexing highway is connected to a time division switch.

6. The time division multiplexing system for a digital exchange as claimed in claim 1, further comprising:

a control bus between the plurality of line interface sections and the control section, wherein the multiplicities of the line interface sections are read by the control section via the control bus.

7. The time division multiplexing system for a digital exchange as claimed in claim 1, where the multiplicity of the line interface sections may be set using a manually operable switch or software.

* * * * *